Figure 3:
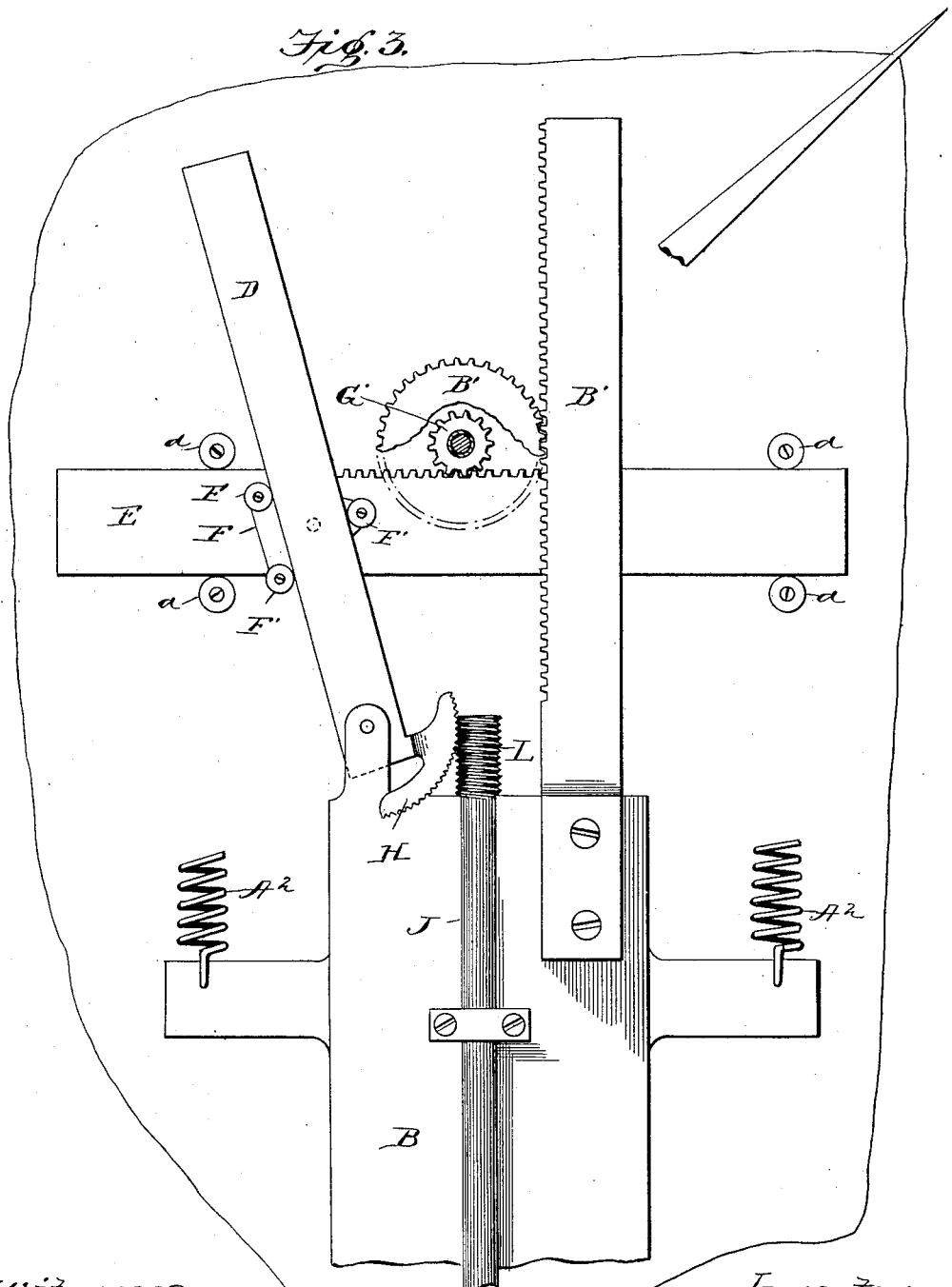

No. 637,153. Patented Nov. 14, 1899.
O. O. OZIAS.
PRICE COMPUTING SCALE.
(Application filed July 15, 1895.)
(No Model.) 3 Sheets—Sheet 1.
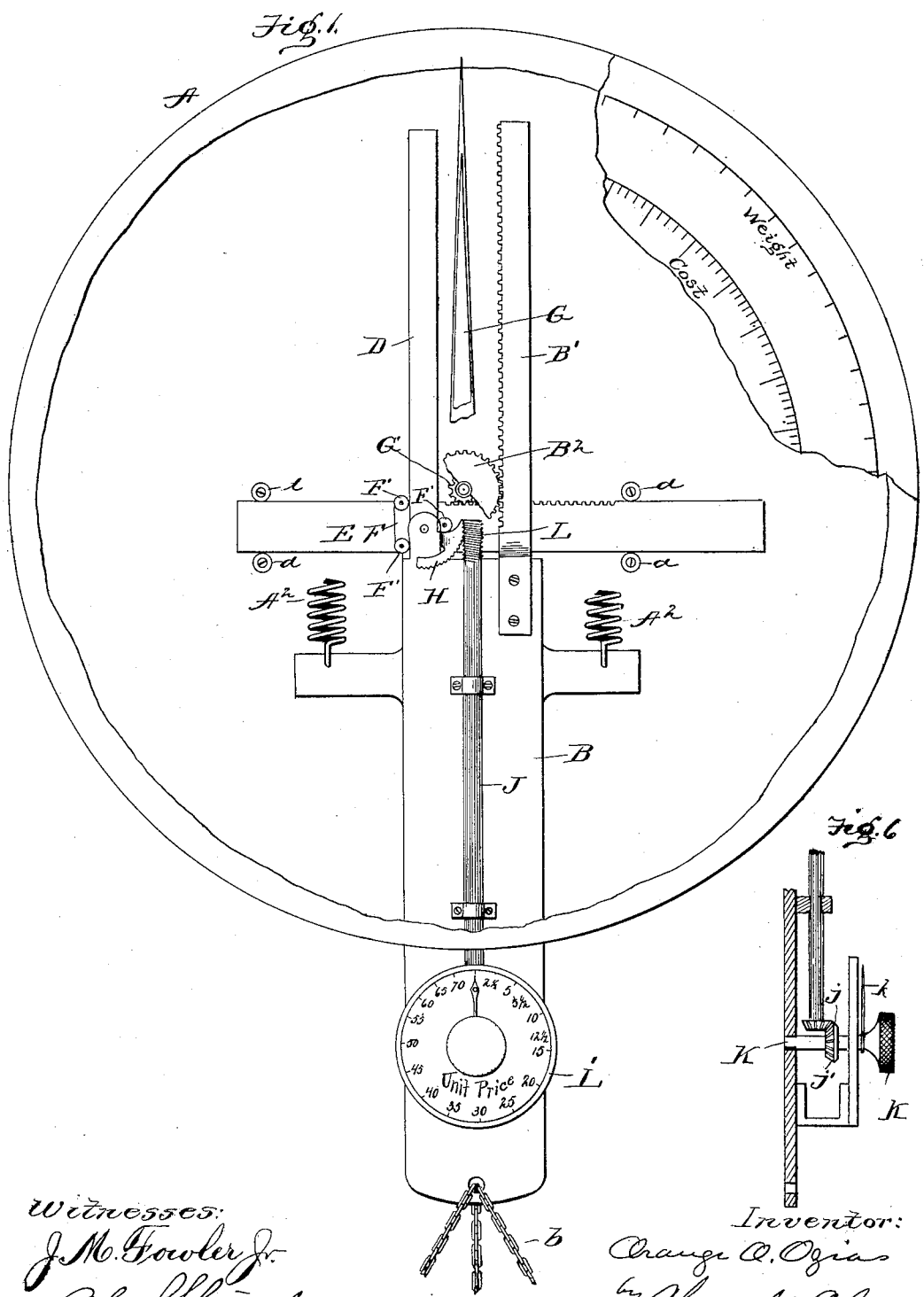
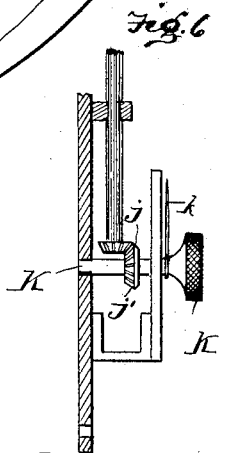
Witnesses:
J. M. Fowler Jr.
Alex J. Stuart
Inventor:
Orange O. Ozias
by Church & Church
his Attorneys.

No. 637,153. Patented Nov. 14, 1899.
O. O. OZIAS.
PRICE COMPUTING SCALE.
(Application filed July 15, 1895.)
(No Model.) 3 Sheets—Sheet 2.
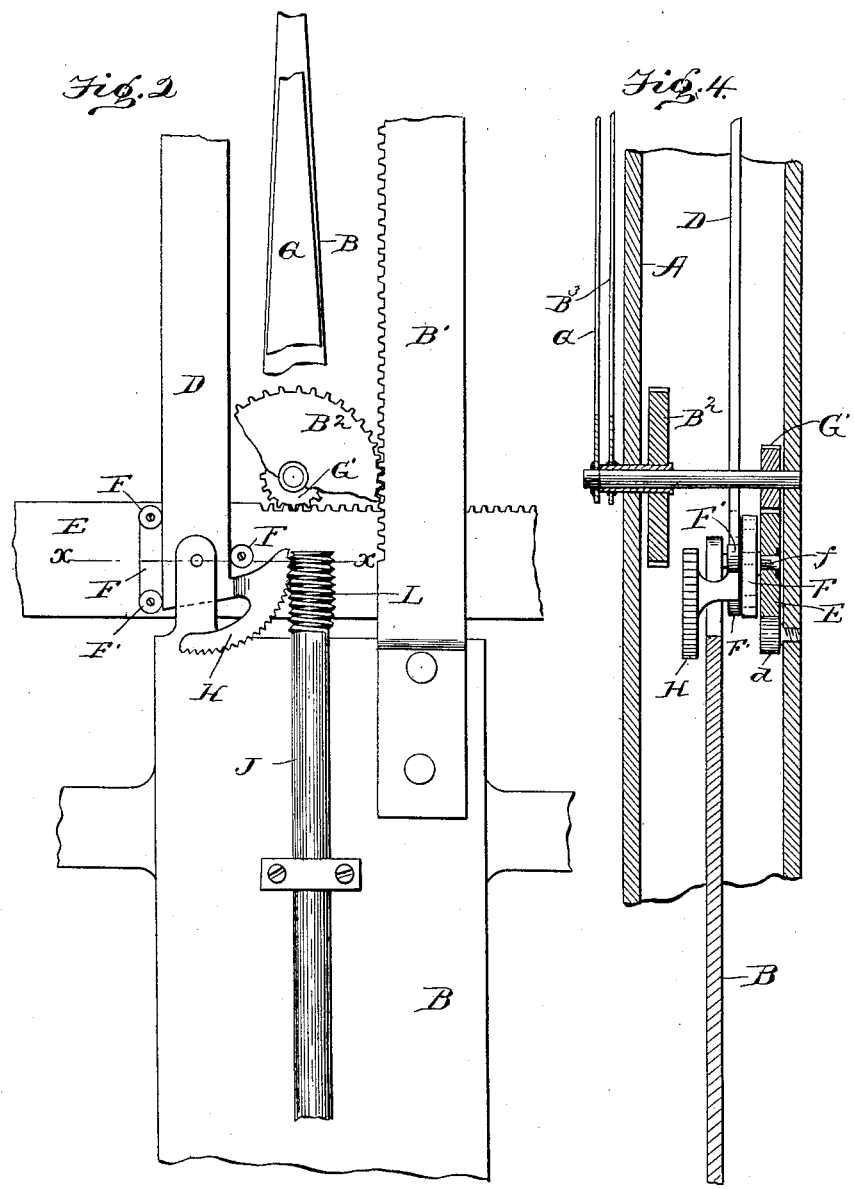
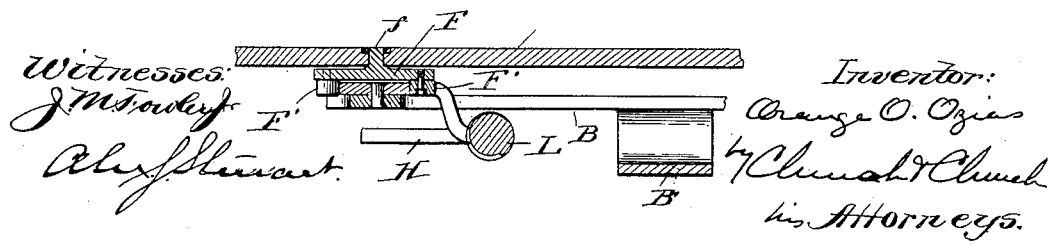
THE NORRIS PETERS CO., PHOTO-LITHO., WASHINGTON, D. C.

No. 637,153. Patented Nov. 14, 1899.
O. O. OZIAS.
PRICE COMPUTING SCALE.
(Application filed July 15, 1895.)

(No Model.) 3 Sheets—Sheet 3.

Witnesses:
J. M. Fowler Jr.
Aly J. Stewart

Inventor:
Orange O. Ozias
by Church & Church
his Attorneys.

UNITED STATES PATENT OFFICE.

ORANGE O. OZIAS, OF DAYTON, OHIO.

PRICE-COMPUTING SCALE.

SPECIFICATION forming part of Letters Patent No. 637,153, dated November 14, 1899.

Application filed July 15, 1895. Serial No. 555,941. (No model.)

*To all whom it may concern:*

Be it known that I, ORANGE O. OZIAS, of Dayton, in the county of Montgomery and State of Ohio, have invented certain new and useful Improvements in Price-Computing Scales; and I do hereby declare the following to be a full, clear, and exact description of the same, reference being had to the accompanying drawings, forming a part of this specification, and to the letters of reference marked thereon.

This invention relates to improvements in computing-scales, or scales such as will indicate the cost of an article at any predetermined value per unit of weight; and the invention has for its object to provide a simple and practical computing mechanism designed principally for use in connection with spring-balance scales, although, as will be obvious to those skilled in the art, features of the invention may be employed in connection with scales of other types where there is a progressive movement as the weight to be weighed is increased, for the purpose of computing values.

The invention consists in a new mechanical movement and in its adaptation to and combination in a price-computing scale, as well as in certain novel details of construction and combinations and arrangements of parts, all as will be now described, and pointed out particularly in the appended claims.

Referring to the accompanying drawings, Figure 1 is an elevation looking at the front of an ordinary spring-balance dial-scale, the dial and some of the parts being broken away in order that the mechanism pertaining to this particular invention may be clearly understood. Fig. 2 is a similar view, on an enlarged scale, of the central mechanism. Fig. 3 is a similar view illustrating the action of the incline. Fig. 4 is a vertical section through the center of Fig. 2. Fig. 5 is a horizontal section on the line $x$ $x$, Fig. 2. Fig. 6 is a detail sectional elevation of the price-per-unit dial and lower end of the screw-shaft.

Like letters of reference in the several figures indicate the same parts.

As a matter of convenience I have shown the invention in connection with an ordinary spring-balance scales, such as are adapted to have a swinging pan.

The letter A indicates the dial-casing, within which is mounted the usual scales mechanism. Thus $A^2$ are the balancing-springs, and B the support or slide for the article to be weighed, the connection with the pan in which the article is placed being made through flexible connections, such as $b$, Fig. 1.

The support or slide B is adapted in scales of this character to control the indicator for indicating the weight in pounds and ounces or other unit standard of weight, and, as in many other scales, I have shown it provided with a rack-bar B' in mesh with a gear-wheel $B^2$, journaled on a shaft central of the dial and carrying in front of the dial a pointer or hand $B^3$, which registers with the usual weight, indicating graduations.

To indicate the cost of an article at different prices per unit on a single graduated scale where the movement is always equal for a given weight, it is necessary to interpose between the movable part of the scale mechanism proper and the cost-indicator a mechanism for imparting a differential movement to the cost-indicator. In other words, the cost-indicator must move farther when the rate is high than it does when the rate is low with an equal movement of the weighing mechanism. It has been found very difficult to accomplish this result without affecting the accurate working of the scales, due principally to the friction and to the resistance offered by the computing mechanism to the movement of the scales mechanism. I have in the present structure overcome those difficulties, and in order to attain the desired ends I provide an adjustable incline and a laterally-movable indicator-controller coöperating therewith, one of said parts being in this instance preferably mounted to move with the support for the article to be weighed, while the other is mounted in the casing. The angle of inclination of the incline determines the extent of movement of the indicator-controller for any given movement of the said support, so that by varying such inclination the rate units or price per unit may be readily and quickly changed.

In the practical embodiment of the invention illustrated the incline is indicated by the letter D, and the indicator-controller by the letter E. The incline is pivotally connected to the upper end of the support or slide B, and the indicator-controller is mounted to move laterally of the incline on antifriction-rollers $d$, supported by the casing A. A connection between the indicator-controller and incline is effected in this instance through the medium of a driver or pivotal piece F, pivotally connected to the front side of the indicator-controller by a pivot $f$ and having three or more antifriction-rollers F' on the front, forming a way in which the incline may move freely endwise. Other forms of guide devices might be employed instead of the antifriction-rollers, but the latter are simple, interpose practically no friction, and are therefore preferred. The effect of this connection, it will now be seen from Fig. 3, is that when the incline is set at an angle and then depressed, as by a weight placed in the pan, the indicator-controller is shifted laterally, the extent of such lateral movement depending upon the angle of the incline and the extent of movement of the support B. It will be particularly observed in this connection that the center upon which the incline is adjusted and the center upon which the guide or turn-plates turn are substantially coincident when the parts are in normal position, Figs. 2 and 5. Hence the turning or adjusting of the incline does not disturb in the least the position of the indicator-controller, the latter being moved only when the incline or its driver is moved bodily with relation to the said controller, as by a downward movement of the slide upon which it is mounted.

From the foregoing it is now clear that if I provide an indicator to be moved by the controller, (I prefer to employ a hand or pointer G, mounted on the central shaft and moved by the pinion G', meshing with a rack on the controller,) a scale with which said indicator may register, and a scale for determining the angle of the incline I have a structure whereby the incline may be set to move the pointer or indicator any distance within the capacity of the scales for any given depression of the slide, and it is a simple matter to properly proportion the graduations for the indicator and incline to indicate cost prices at any rate per unit of weight.

In the preferred construction of apparatus the mechanism for setting and locking the incline in adjusted position consists of a gear-segment H, formed as a part of or rigidly connected to the incline and a coöperating worm L, the latter being carried by a shaft J, journaled on the slide. The shaft J carries a beveled pinion $j$ at the lower end in mesh with a similar pinion $j'$ on a shaft K, and the latter carries a pointer $k$, adapted to register with the rate-per-unit indications on a dial L'.

For convenience the shaft K is provided with a handle K', by means of which the incline may be moved, and the pointer shows when the proper angle is reached for any given rate per unit. The screw not only serves as the actuating device for the incline, but it also locks it any point, and in order that the utmost accuracy may be secured I preferably mount the parts in such manner as that there will be no lost motion, and for this reason the joints may be made "stiff" or tight and the teeth on the segment and worm may wedge together and be held tight by the elasticity of the screw-shaft.

In operating the scales the rate-per-unit or price pointer or indicator is first turned to the desired rate, and in setting it the operator also sets the incline to the proper angle to move the cost-indicator in proper proportion to indicate the cost price of any article placed in the pan at that rate per unit. The two pointers on the dial—i. e., the cost-indicator and the weight-indicator—move in the same direction and enable the buyer not only to see the exact weight, but also to see the cost of the article without having to mentally compute the same.

The whole computing mechanism, it will be observed, is a simple addition to an ordinary scale mechanism wherein the moving parts have a progressively-forward movement as the weight of the article to be weighed is increased, and while I have described a specific embodiment wherein the adjustable incline D is carried by the support B for the article to be weighed and the driver F mounted upon a cost-indicator controller E in engagement with said incline D for imparting movement from the incline D to said controller E, and it is obvious that it is immaterial whether the parts be arranged as described and shown in the specific embodiment of my invention or whether the incline D and its setting mechanism is mounted upon the cost-indicator controller E or elsewhere and the driver F in engagement only with said incline D and carried by the support B for the article to be weighed, it only being essential that the incline and the cost-indicator controller should be moved in fixed relation to each other in proportion as the movable mechanism of the weighing-scales is moved, said proportion being variable as the angle of inclination of the said incline is varied to change the unit price per pound.

The mechanism described specifically for carrying out the functions of a price-computing scale, it is obvious, constitute in themselves a mechanical movement which may be useful for other purposes, and in its broader sense anticipates the employment of, first, a member or carrier-plate moving, preferably, in a substantially straight line; second, a measuring member or indicator operated thereby for measuring the extent of movement of said carrier-plate; third, a variable incline or controlling member; fourth, a second member constituting a carriage or traveler; fifth, two measuring members, one to indicate the angle of inclination of the incline or controlling member and the other to indicate the extent of movement of the second-member carriage or traveler, and, sixth, means including said incline or controlling member for causing said first member or carrier-plate to impart movement to said second-member carriage or traveler proportionate to the angle of inclination of said incline. In the specific embodiment shown it will be understood that the said first member, in addition to being provided with a measuring member, is provided with a variable counterbalance (namely, springs, although pick-up weights or a pendulum-weight might be substituted) to give said member a uniformly-progressive movement for each unit of weight contained in the article being weighed.

Having thus described my invention, what I claim as new is—

1. In a computing-scales, the combination with the support for the article to be weighed balanced to have a progressive movement as the weight of the article being weighed is increased, of a cost-indicator, a controller therefor, an adjustable incline for moving said controller and an adjusting mechanism for said incline, both said incline and its adjusting mechanism being movable in unison with the support; substantially as described.

2. In a computing-scales, the combination with the support for the article to be weighed, balanced to have a progressive movement as the weight of the article being weighed is increased, a cost-indicator, a controller, of an adjustable incline coöperating with the controller and an adjusting mechanism for the incline both mounted on the support for the article to be weighed; substantially as described.

3. In a computing-scales, the combination with the support for the article to be weighed balanced to have a progressive movement as the weight of the article being weighed is increased, the cost-indicator and the indicator-controller, of the incline coöperating with the controller, the incline-adjusting mechanism and the pointer for showing the angle of the incline mounted to move together in unison with the support for the article being weighed, substantially as described.

4. In a computing-scales, the combination with the support for the article to be weighed balanced to have a progressive movement as the weight of the article being weighed is increased, the cost-indicator and the indicator-controller of the incline coöperating with the controller and mounted to move in unison with the support and the incline-adjusting mechanism consisting of the gear-segment and worm meshing therewith; substantially as described.

5. In a computing-scales, the combination with the support for the article to be weighed balanced to have a progressive movement as the weight of the article being weighed is increased, the cost-indicator and the indicator-controller, of the adjustable incline moving in unison with the support and coöperating with the controller to move the latter, the gear-segment connected with the incline, and the operating-worm in mesh with said segment with means for rotating the worm; substantially as described.

6. In a computing-scales, the combination with the support for the article to be weighed balanced to have a progressive movement as the weight of the article being weighed is increased, the cost-indicator and the indicator-controller, of the pivoted adjustable incline moving in unison with the support and coöperating with the controller to move the latter the gear-segment rigidly connected with the incline, the worm in mesh with the segment and the dial and pointer for indicating the angle of the incline mounted to move in unison with the support; substantially as described.

7. In a computing-scales, the combination with the support for the article to be weighed balanced to have a progressive movement as the weight of the article being weighed is increased, the cost-indicator and the controller therefor, of the pivoted incline movable together with its adjusting mechanism in unison with the support, and a connection between the incline and controller having a center coincident with the pivotal center of the incline when the parts are in normal position whereby the angular adjustment of the incline does not move the controller; substantially as described.

8. In a computing-scales, the combination with the support for the article to be weighed balanced to have a progressive movement as the weight of the article being weighed is increased, the cost-indicator and the controller therefor, of the pivoted incline movable in unison with the said support and the pivoted guide for the incline moving in unison with the controller and having its center coincident with the pivotal center of the incline when in normal position whereby the adjustment of the angle of the incline will not move the controller; substantially as described.

ORANGE O. OZIAS.

Witnesses:
E. CANBY,
IRA C. KOEHNE.